(12) United States Patent
Latina

(10) Patent No.: US 11,269,589 B2
(45) Date of Patent: Mar. 8, 2022

(54) INTER-CHANNEL AUDIO FEATURE MEASUREMENT AND USAGES

(71) Applicant: DOLBY LABORATORIES LICENSING CORPORATION, San Francisco, CA (US)

(72) Inventor: Christopher Ryan Latina, North Andover, MA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/131,669

(22) Filed: Dec. 22, 2020

(65) Prior Publication Data

US 2021/0191687 A1    Jun. 24, 2021

(30) Foreign Application Priority Data

Dec. 23, 2019 (EP) .................................... 19219223

(51) Int. Cl.
| | |
|---|---|
| *G06F 3/16* | (2006.01) |
| *G10L 21/14* | (2013.01) |
| *H04S 3/00* | (2006.01) |
| *H04S 7/00* | (2006.01) |

(52) U.S. Cl.
CPC .............. *G06F 3/165* (2013.01); *G10L 21/14* (2013.01); *H04S 3/008* (2013.01); *H04S 7/30* (2013.01); *H04S 2400/01* (2013.01); *H04S 2400/11* (2013.01)

(58) Field of Classification Search
USPC .................. 381/5, 58, 80, 85, 300, 303, 306
See application file for complete search history.

(56) References Cited

U.S. PATENT DOCUMENTS

| | | | |
|---|---|---|---|
| 7,698,008 B2* | 4/2010 | Steinberg | ................ G10L 25/48 700/94 |
| 2007/0269063 A1 | 11/2007 | Goodwin | |
| 2017/0156015 A1 | 6/2017 | Stockhammer | |
| 2019/0007754 A1 | 1/2019 | Master | |

(Continued)

FOREIGN PATENT DOCUMENTS

| | | |
|---|---|---|
| EP | 2146522 | 1/2010 |
| WO | 2006075079 A1 | 7/2006 |
| WO | 2018073759 A1 | 4/2018 |

(Continued)

OTHER PUBLICATIONS

Boersma, P. et al Praat online manual: doing Phonetics by Computer: Intro, Jan. 31, 2011.

(Continued)

*Primary Examiner* — Yosef K Laekemariam

(57) ABSTRACT

A pair of sets of audio blocks is determined from a multi-channel audio signal. The pair comprises a first set for a first time block over audio channels and a second set for a second time block over the audio channels. Audio features including inter-channel audio features are generated from the pair. The audio features are graphically presented with user interface components on a display page. A specific perceptible audio characteristic is visually conveyed to the user using the user interface components dynamically updated with sets of audio features computed from pairs of sets of audio blocks of the multi-channel audio signal.

15 Claims, 7 Drawing Sheets

(56) References Cited

U.S. PATENT DOCUMENTS

2019/0103118 A1    4/2019  Atti

FOREIGN PATENT DOCUMENTS

| WO | WO 2018073759 | * | 4/2018 | ............... H04S 1/00 |
| WO | 2018097288 A1 | | 5/2018 | |

OTHER PUBLICATIONS

Dixon, A. Onset Detection Revisted. Proc. of the 9thInt. Conference on Digital Audio Effects (DAFx-06). Montreal, Canada, 2006.
Dolby: "Dolby AC-4: Audio Delivery for Next-Generation Entertainment Services" located via google Scholar, Jun. 2015.
Henninger, Mark "Dolby AC-4 at CES 2016" Jan. 2016.
Kendall, G. (1995). "The Decorrelation of Audio Signals and Its Impact on Spatial Imagery" Computer MusicJournal, 19(4), 71-87.
Lerch, A. "An introduction to audio content analysis applications in signal processing and music informatics". Wiley, Hoboken, NJ, 2012.
Takayuki Hidaka, Leo L. Beranek, and Toshiyuki Okano. (1995). Interaural cross-correlation, lateral fraction, and low- and high-frequency soundlevels as measures of acoustical quality in concert halls. The Journal of the Acoustical Society of America 98, 988.

* cited by examiner

| CHANNEL | L | R | C | Ls | Rs | Lh | Rh |
|---------|---|---|---|----|----|----|----|
| L-1 | SF[L,L-1] | SF[R,L-1] | SF[C,L-1] | SF[Ls,L-1] | SF[Rs,L-1] | SF[Lh,L-1] | SF[Rh,L-1] |
| R-1 | SF[L,R-1] | SF[R,R-1] | SF[C,R-1] | SF[Ls,R-1] | SF[Rs,R-1] | SF[Lh,R-1] | SF[Rh,R-1] |
| C-1 | SF[L,C-1] | SF[R,C-1] | SF[C,C-1] | SF[Ls,C-1] | SF[Rs,C-1] | SF[Lh,C-1] | SF[Rh,C-1] |
| Ls-1 | SF[L,Ls-1] | SF[R,Ls-1] | SF[C,Ls-1] | SF[Ls,Ls-1] | SF[Rs,Ls-1] | SF[Lh,Ls-1] | SF[Rh,Ls-1] |
| Rs-1 | ⋮ | ⋮ | ⋮ | ⋮ | ⋮ | ⋮ | ⋮ |
| Lh-1 | ⋮ | ⋮ | ⋮ | ⋮ | ⋮ | ⋮ | ⋮ |
| Rh-1 | SF[L,Rh-1] | SF[R,Rh-1] | SF[C,Rh-1] | SF[Ls,Rh-1] | SF[Rs,Rh-1] | SF[Lh,Rh-1] | SF[Rh,Rh-1] |

FIG. 2A

| L Lh | Lh R | L Rh | Rh C | R Rh | Rh L | R Rh |
|------|------|------|------|------|------|------|
| C Lh | L | L R | C | R L | R | C Rh |
| Lh L | L Ls | L Rs | C R | R Ls | R Rs | Rh R |
| Lh | Lh Rh | L C | C L | R C | Rh Lh | Rh |
| Lh Ls | Ls L | Ls R | Rs C | Rs L | Rs R | Rh Rs |
| C Ls | Ls | Ls Rs | Ls C | Rs Ls | Rs | C Rs |
| Ls Lh | Lh Rs | Ls Rh | Lh C | Rs Lh | Rh Ls | Rs Rh |

FIG. 3C — TABLE COLUMNS / TABLE ROWS

| L Lh | Lh R | L Rh | Rh C | R Rh | Rh L | R Rh |
|------|------|------|------|------|------|------|
| C Lh | L | L R | C | R L | R | C Rh |
| Lh L | L Ls | L Rs | C R | R Ls | R Rs | Rh R |
| Lh | Lh Rh | L C | C L | R C | Rh Lh | Rh |
| Lh Ls | Ls L | Ls R | Rs C | Rs L | Rs R | Rh Rs |
| C Ls | Ls | Ls Rs | Ls C | Rs Ls | Rs | C Rs |
| Ls Lh | Lh Rs | Ls Rh | Lh C | Rs Lh | Rh Ls | Rs Rh |

FIG. 3D — TABLE COLUMNS / TABLE ROWS

| | | | | | | |
|---|---|---|---|---|---|---|
| L Lh | Lh R | L Rh | Rh C | R Rh | Rh L | R Rh |
| C Lh | | L R | C | R L | R | C Rh |
| Lh L | L Ls | L Rs | C R | R Ls | R Rs | Rh R |
| Lh | Lh Rh | L C | C L | R C | Rh Lh | Rh |
| Lh Ls | Ls L | Ls R | Rs C | Rs L | Rs R | Rh Rs |
| C Ls | Ls | Ls Rs | Ls C | Rs Ls | Rs | C Rs |
| Ls Lh | Lh Rs | Ls Rh | Lh C | Rs Lh | Rh Ls | Rs Rh |

FIG. 3E

| | | | | | | |
|---|---|---|---|---|---|---|
| 0.0520 | 0.0080 | 0.0550 | 0.0070 | 0.0230 | 0.0060 | 0.0230 |
| 0.0520 | 0.0260 | 0.0340 | 0.0250 | 0.0100 | 0.0100 | 0.0540 |
| 0.0070 | 0.0420 | 0.0450 | 0.0350 | 0.0140 | 0.0160 | 0.0060 |
| 0.0060 | 0.0060 | 0.0270 | 0.0300 | 0.0090 | 0.0050 | 0.0040 |
| 0.0090 | 0.0080 | 0.0090 | 0.0030 | 0.0050 | 0.0040 | 0.0080 |
| 0.0420 | 0.0100 | 0.0120 | 0.0060 | 0.0050 | 0.0040 | 0.0440 |
| 0.0170 | 0.0090 | 0.0190 | 0.0090 | 0.0090 | 0.0070 | 0.0110 |

FIG. 3F

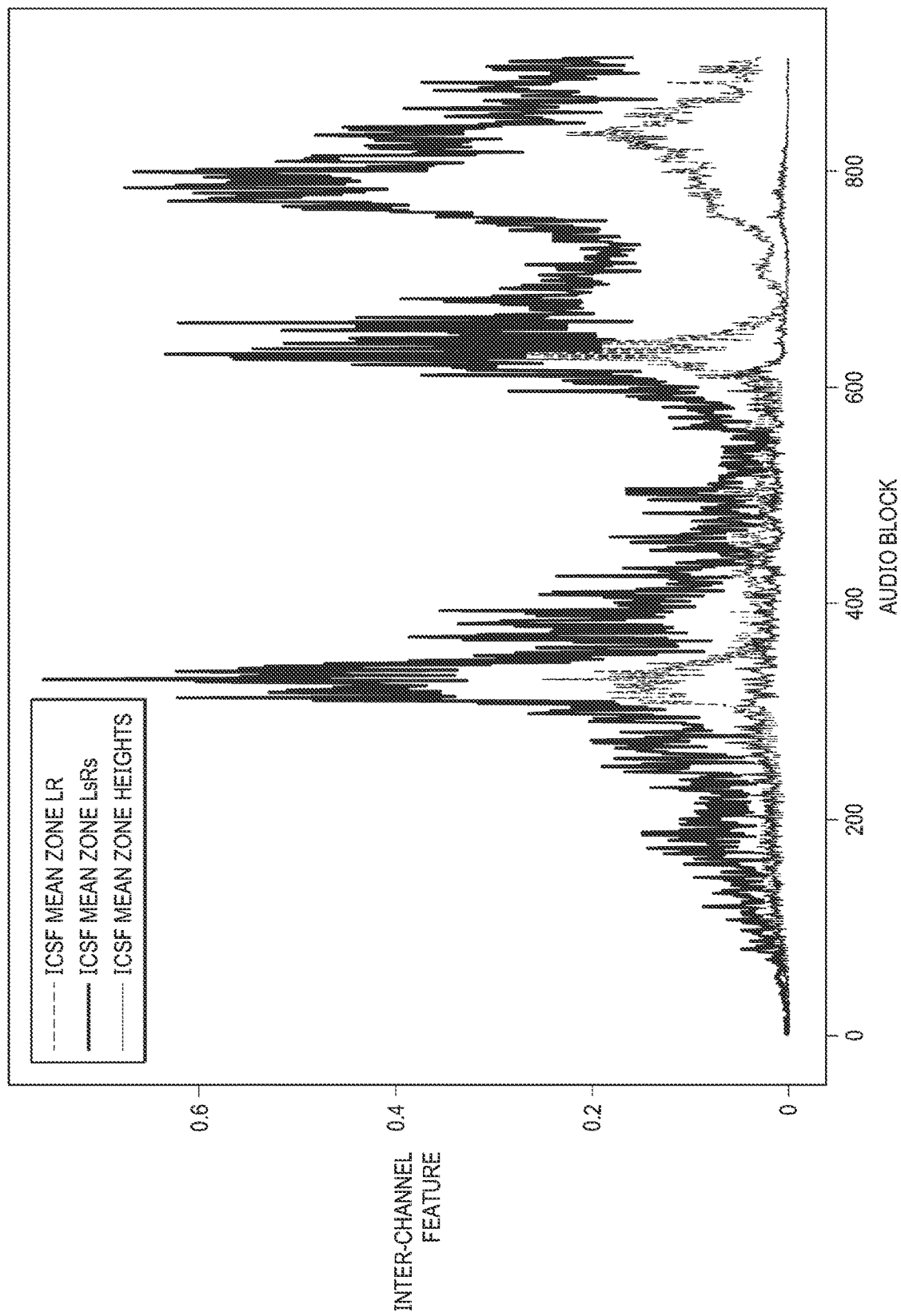

INTER-CHANNEL AUDIO FEATURE MEASUREMENT AND USAGES

CROSS-REFERENCE TO RELATED APPLICATIONS

This application claims the benefit of priority from U.S. Provisional Patent Application No. 62/952,822, filed on 23 Dec. 2019, and EP Patent Application No. 19219223.5, filed on 23 Dec. 2019, each of which is hereby incorporated by reference in its entirety.

TECHNOLOGY

Embodiments of the present invention pertain generally to processing audio signals and pertain more specifically to inter-channel audio feature measurement and usages.

BACKGROUND

Multiple audio processors may be used in end-to-end audio processing chains to deliver audio content to end user devices. Different audio processors may perform different or similar media processing operations to generate output audio content for rendering or reproduction with a variety of audio speaker configurations. The same input media data as received by the end-to-end audio processing chains may undergo different or similar audio sample data manipulations, conversions, and modifications to produce different quality levels in audio rendering or reproduction.

Some of these audio processing operations to varying extents may be prone to introducing artifacts, unintended results, delays, latency, channel mapping issues, dropouts, transmission errors, coding/quantization errors, or the like.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

Example embodiments of the present invention are illustrated by way of example, and not by way of limitation, in the figures of the accompanying drawings and in which like reference numerals refer to similar elements and in which:

FIG. 2A illustrates an example audio feature matrix.

FIG. 3A through FIG. 3G illustrate example graphic user interface (GUI) representations of audio media features;

DESCRIPTION OF EXAMPLE EMBODIMENTS

Figure 1:
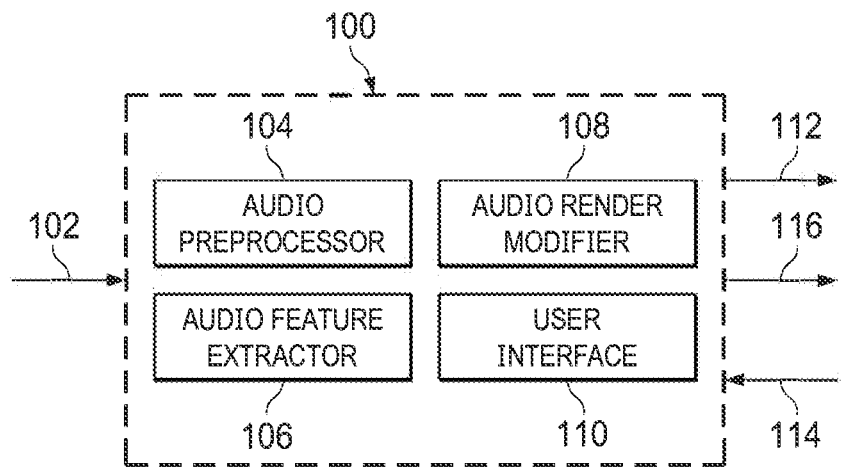
FIG. 1 illustrates an example audio render analyzer.

Example embodiments, which relate to inter-channel audio feature measurement and usages, are described herein. In the following description, for the purposes of explanation, numerous specific details are set forth in order to provide a thorough understanding of example embodiments of the present invention. It will be apparent, however, that embodiments of the present invention may be practiced without these specific details. In other instances, well-known structures and devices are not described in exhaustive detail, in order to avoid unnecessarily occluding, obscuring, or obfuscating example embodiments of the present invention.

Example embodiments are described herein according to the following outline:

1. SUMMARY
2. AUDIO RENDER ANALYZER
3. AUDIO FEATURES
4. COLOR CODING SPATIAL POSITIONS OF AUDIO CHANNELS
5. GUI REPRESENTATIONS OF AUDIO MEDIA FEATURES
6. EXAMPLE PROCESS FLOWS
7. IMPLEMENTATION MECHANISMS—HARDWARE OVERVIEW
8. EQUIVALENTS, EXTENSIONS, ALTERNATIVES AND MISCELLANEOUS

1. Summary

This summary presents a basic description of some aspects of an embodiment of the present invention. It should be noted that this summary is not an extensive or exhaustive summary of aspects of the embodiment. Moreover, it should be noted that this summary is not intended to be understood as identifying any particularly significant aspects or elements of the embodiment, nor as delineating any scope of the embodiment in particular, nor embodiments of the invention in general. This summary merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein may be implemented and performed with authoring and/or analysis tools/systems. These techniques can be used by the tools/systems in real-time or near-real-time operations. In some operational scenarios, audio signals (e.g., audio visual signals, media signals, etc.) are decoded by way of audio processors/codecs. Example audio processors/codecs used to decode audio signals as described may include, but are not necessarily limited to only, any of: Dolby Digital Plus Joint Object Coding or DD+ JOC codecs, Dolby Atmos codecs, codecs processing stereo, 5.1 or 5.1.2 audios, and so on.

Audio features are determined/generated using decoded audio data from the audio signals. Audio feature matrices with matrix elements representing/storing the audio features (e.g., cross-channel or inter-channel correlation coefficients, spectral fluxes, etc.) may be generated directly from the audio features, without needing to receive audio object metadata. The audio feature matrices may be presented to users (e.g., audio engineers, audio professionals, audio authoring users, etc.).

User interface components used to present audio feature information in the audio feature matrices may be color coded. For example, different colors may be assigned based on different values or properties of audio features such as audio channels of audio data used to compute the audio features. These user interface components may also be graphically annotated. For example, the user interface components may comprise visually displayed arrows, audio speaker position indications, positive or negative correlation indications, decorrelation indications, etc.

Example authoring and analysis tools/systems implementing or performing audio feature extraction and usages as described herein may include, but are not necessarily limited to only, any of: digital audio workstations, Avid Pro tools, Logic Pro X tools, Ableton Live tools, Steinway Cubase tools, game design tools, virtual reality platforms, Unity and Unreal engines, cloud-based or web-based media processors such as Hybrik and/or Amazon Elemental, audio analysis or adaptive effects tool/system incorporating these techniques in software, hardware and/or a combination of software and hardware, and so forth.

Audio features as determined/generated from the decoded audio data may be grouped into subsets. Statistics such as average, value distribution, feature of features, etc., may be computed from the audio features or the subsets thereof can be used to provide or convey overall measurements, indications and/or representations of audibly perceptible features/characteristics of the audio data in the audio signals. For example, audibly perceptible features/characteristics of audio data as described herein may include, but are not necessarily limited to only, any of: "envelopment" (e.g., visualizations, measurements, and/or representations of specific channels and directions around which sounds are moving, synchronized or unsynchronized attack times in various audio channels, etc.), "immersion", "spatial velocity" (e.g., visualizations, measurements, and/or representations of spatial velocity of an audio object or a depicted sound source, etc.), "cohesion" (e.g., visualizations, measurements, and/or representations of correlation or decorrelation of audio content in various signals, etc.), etc. As used herein, "immersion" or "immersive-ness" refers to (e.g., visualizations of, measurements of, representations of, significant, signal, etc.) presence of audio content or signal energy in surround channels in relation to or in comparison with presence of audio content or signal energy in non-surround channels. In some operational scenarios, a level of immersion or immersive-ness may be a numeric value or a classification computed, determined and/or measured based on surround signal energy of a multi-channel audio signal in comparison with non-surround signal energy of the multi-channel audio signa.

In some operational scenarios, some or all of audibly perceptible features or characteristics can be visually perceived by users via visualization of audio features (e.g., correlation coefficients, spectral fluxes, inter-channel correlation coefficients, inter-channel spectral fluxes, etc.) in authoring tools/systems for the users to adaptively modulate spatial fields (e.g., to-be-rendered audio scenes, to-be-rendered sound fields, etc.) of audio signals to achieve respective target levels of immersion, to achieve target levels of animation, etc. Animation may refer to a change of spatial position of an audio object (e.g., a character, a sound source, etc.), A level of animation may be (e.g., numerically, discretely, etc.) characterized or determined, for example, based on a rate of spatial position change, a rate of spatial position change rate, etc. For example, a spatial sound field depicted in a multi-channel audio signal may be modulated through activating different speakers or different numbers of speakers in different zones of a rendering/listening environment, applying different dynamic range control (DRC) operations to different audio channels/speakers/objects, suppressing or enhancing loudness levels of different audio channels/speakers/objects, modulating spatial metadata parameters, and so forth.

As used herein, a multi-channel audio signal may refer to an overall audio signal comprising a plurality of component audio signals respectively corresponding to a plurality of audio channels/speakers in a rendering/reproduction environment for audio/sound reproducing/rendering represented in the plurality of component audio signals. For example, the multi-channel audio signal or a modified signal generated therefrom may be used to provide PCM data for driving transducers in audio speakers to produce spatial pressure waves of a spatial sound field represented in the multi-channel audio signal.

Additionally, optionally or alternatively, these features and characteristics can be used in real-time broadcasts and production studios to support creative (authoring) and validation operations. For example, audio features extracted from a query content of a query audio signal (e.g., a mono audio signal, a stereo audio signal, a multi-channel audio signal, etc.) can be compared with reference or curated audio features already extracted from audio contents stored in a content/template database to identify matches or similarities between the query audio content and any of the reference audio contents.

These audio features of the query content represent metrics or a query feature vector to be compared with corresponding audio features of reference audio contents to identify one or more matched reference audio contents, and to use the one or more matched reference audio contents to identify, infer, deduce or classify the query content's level(s) of immersion, "genre", "mix style," etc., in real time broadcast applications as well as non-broadcast media production operations. Additionally, optionally or alternatively, the query content's levels of immersion, "genre", "mix style," etc., can be used in automated (e.g., fully, with user input, etc.) mixing operations to transfer an "immersive-ness", "genre", "mix style," etc., from a template to the query audio content. For example, "immersive-ness", "genre", "mix style," etc., of matched reference audio contents can be used as template(s) or as look-up key(s) to look up or identify applicable template(s) of "immersive-ness", "genre", "mix style," etc., from a reference/template database that stores templates of "immersive-ness styles.

Additionally, optionally or alternatively, a system as described herein may use audio features or information derived therefrom to determine, infer and/or modify animation of (e.g., an array of, etc.) audio objects and depicted sound sources in a multi-channel audio signal as described herein Animation styles from template audio content may also be transferred to, or implemented with, audio content in the multi-channel audio signal. Additionally, optionally alternatively, audio features and information (e.g., immersive-ness, etc.) derived therefrom of a variety of audio contents in audio signals that have been processed by a system as described can be stored as new templates/references in a template library or data store, along with any user input and/or modifications made to the audio contents.

In addition to monitoring and validating (e.g., per block/frame, etc.) audio features and audio characteristics for short form (e.g., 15 seconds long, etc.) audio content, visualization of metrics or measurement of audio features and audio characteristics can be used in long form (e.g., two hours long, etc.) multi-channel spatial audio renders to locate or identify time periods of interest, immersive zones, animation of audio objects, etc., over relatively long time scales. For example, audio scenes such as suspenseful portions, melancholy portions and other interesting/important time periods/portions in a long form (e.g., two-hour long, a sports game, etc.) multi-channel audio signal may be detected or recognized by a user or a system under techniques as described herein.

In some operational scenarios, channel and/or inter-channel features and characteristics as described herein can be used with non-real-time offline processes in a quality control (QC) context, for example to support cloud-based or web-based render validation. As used herein, an audio render refers to audio data (e.g., PCM data, etc.) generated near or at the end of an end-to-end content delivery and/or consumption chain to (e.g., directly, etc.) drive audio speakers of a target audio speaker configuration/environment (e.g., a target audio channel configuration/environment, a target audio playback configuration or environment, etc.) for audio/sound reproduction or rendering.

Audibly perceptible artifacts between or among various audio encoders and renderers (e.g., audio decoders, etc.) can be compared and detected by taking differences (including but not limited to differences or Euclidean distances of multi-dimensional data) between or among feature matrices of audio renders (e.g., at each block, etc.) and by detecting timbre or transient smearing (e.g., to temporal errors and misalignments in different channels, etc.) in spatial audio productions or spatial audio renders.

In some operational scenarios, spatial information such as time-dependent positions, directions, trajectories, velocities, etc., of audio objects or depicted sound sources (e.g., a person, a car, an airplane, a crowd, etc.) in audio content of an input multi-channel audio signal may be identified using channel and/or inter-channel features and characteristics as described herein. The spatial information of the depicted sound sources may be included in, or used to generate, spatial audio metadata to be transmitted with corresponding audio data (e.g., audio sample data, PCM data, etc.) in an output multi-channel audio signal. The spatial audio metadata can be generated without needing to receive any original spatial audio metadata in the input or original multi-channel audio signal, and be beneficially used in a game engine, in a media program, etc., to help an rendering system to depict an audiovisual environment or scene relatively lively and efficiently. The spatial audio metadata may identify a specific spatial direction to which an audio object is moving at a given time, a specific position at which an audio object is located, whether an audio object is entering into or leaving from a zone, whether an audio object is rotating clockwise or counter-clockwise, which zone an audio object will be entering in future, and so forth. The spatial audio metadata may be extracted by a recipient device from the output signal that has been added or encoded with the spatial audio metadata. By way of the output signal that includes the spatial audio metadata, audio object or to-be-depicted sound sources can be rendered at relatively accurate spatial locations in games, movies, etc., even when the input or original multi-channel audio signal may not have audio metadata that includes spatial information of the depicted sound sources.

Additionally, optionally or alternatively, spatial information of audio objects or depicted sound sources generated/identified through channel and/or inter-channel features and characteristics as described herein can be extended to be used by audio production tools (e.g., open-source tools, etc.) for virtual reality (VR), spatialized music, and/or sound synthesis applications.

Example embodiments are directed to visualization of audio features and audio characteristics in audio content authoring and/or monitoring systems. It is determined, from a multi-channel audio signal, a pair of sets of audio blocks, which comprises a first set of audio blocks for a first time block over a plurality of audio channels and a second set of audio blocks for a second time block over the plurality of audio channels. The first time block is different from the second time block. A set of audio features is generated from the first set of audio blocks and the second set of audio blocks in the pair of sets of audio blocks. The set of audio features includes one or more inter-channel audio features. The set of audio features is graphically presented to a user by way of a set of user interface components on a display page. Each user interface component in the set of user interface components represents a respective audio feature in the set of audio features. The respective audio feature is computed from a first audio block in the first set of audio blocks and a second audio block in the second set of audio blocks. A specific perceptible audio characteristic is visually conveyed to the user using the set of user interface components on the display page dynamically updated with a plurality of sets of audio features computed from a plurality of pairs of sets of audio blocks of the multi-channel audio signal. Each set of audio features in the plurality of sets of audio features is computed from a respective pair of sets of audio blocks in the plurality of pairs of sets of audio blocks.

In some embodiments, mechanisms as described herein form a part of a media processing system, including but not limited to: an audiovisual device, a flat panel TV, a handheld device, game machine, television, home theater system, tablet, mobile device, laptop computer, netbook computer, cellular radiotelephone, electronic book reader, point of sale terminal, desktop computer, computer workstation, computer kiosk, various other kinds of terminals and media processors, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Audio Render Analyzer

FIG. 1 illustrates an example audio render analyzer 100 comprising an audio pre-processor 104, an audio feature extractor 106, an audio render modifier 108, a user interface 110, etc. Some or all of these devices or components in the audio render analyzer 100 may be implemented with one or more computing devices and may be operatively linked with one another through local data connections, remote data connections, cloud-based or web-based network connections, etc.

As shown in FIG. 1, the audio render analyzer 100 is configured to receive/collect one or more (e.g., mono, stereo, multi-channel, etc.) audio signals 102 (e.g., individually as multi-channel audio signals, as a part of an overall multi-channel audio signal, etc.) to be analyzed for quality, styles, zones of interests, etc., using channel-specific and/or inter-channel audio features extracted from audio data of the audio signals 102. The audio signals 102 may or may not comprise spatial audio metadata that indicates spatial information (e.g., positions, orientations, velocities, trajectories, etc.) of audio objects or depicted sound sources represented in the audio data of the audio signals 102. In some operational scenarios, an audio signal from which audio content/sample data is decoded, as described herein, may represent DD+ or AC4 media/audio. The audio content/sample data decoded from the DD+ or AC4 media/audio may be applied with specific dynamic range control operations corresponding to a specific speaker configuration arrangement (e.g., actually, etc.) presented in a rendering environment and routed to the specific speaker configuration/arrangement for sound rendering/production.

In some operational scenarios, the audio data of the audio signals 102 is directly used for feature analysis. In some operational scenarios, the audio pre-processor 104 performs one or more audio processing operations on the audio data of the audio signals 102 to generate pre-processed audio data for feature analysis.

In any event, the audio data for feature analysis is used as input by the audio feature analyzer 106 to extract or generate audio features including but not limited to: channel-specific audio features, inter-channel audio features, audio features further generated (e.g., averaging, different orders of derivatives of audio features, higher-order fluxes computed from lower-order fluxes, etc.) using some or all of the channel-specific audio features and/or the inter-channel audio features, spatial information of audio objects and/or depicted sound sources represented in the audio signals 102, and so forth.

In some operational scenarios, the audio render analyzer 100 provides some or all of the audio features, the spatial information, etc., as output data 112 to one or more other devices and/or data stores operating in conjunction with the audio render analyzer 100.

In some operational scenarios, the user interface 110 interacts with a user through one or more user interface pages (e.g., GUI display pages, etc.). The user interface 110 can present, or cause displaying, user interface components depicting some or all of the output data 112 to the user through the user interface pages. The user interface 110 can receive some, or all, of the user input 114 through the one or more user interfaces.

The audio render analyzer 100 receives user input 114 that provides feedbacks or changes to processes, algorithms, operational parameters, etc., that are used in analyzing or modifying the audio data of the audio signals 102. Example user feedbacks may include, but are not necessarily limited to only, user input related to one or more audio processing operations of: enhance or shrink immersive-ness, enhance or shrink cross channel coherence, modifying attack times in specific audio channels, modify dynamic range control (DRC) operations in specific audio channels, transfer or infuse the audio signals with reference styles from templates, classify audio content/scenes depicted in the audio signals, validate audio renders generated by different audio renderers/decoders, monitor one or more listener-perceptible characteristics/qualities of the audio signals, etc. In various embodiments, audio processing operations as described herein may be performed by the audio render analyzer 100, by an external system (e.g., an audio renderer/decoder, a cloud-based or web-based system, etc.), by a combination of one or more systems including or other than the audio render analyzer 100, etc.

In some operational scenarios, the audio render analyzer 100 sends control data 216 to one or more processes, algorithms, operational parameters, etc., that are used in one or more audio processing operations to modify the audio signals 102 into one or more modified audio signals. In some operational scenarios, the audio render modifier 108 generates the control data 216 automatically, or programmatically with or without user input. Additionally, optionally or alternatively, the audio render modifier 108 may perform some or all of the processes, algorithms, operational parameters, etc., implemented with the audio processing operations to modify the audio signals 102 into the modified audio signals. The modified audio signals may be used by a plurality of audio speakers for audio reproduction or rendering, in place of the audio signals 102. Modification of the audio signals 102 may include, but is not limited to, adding spatial audio metadata generated by the audio render analyzer 100, changing audio data or performing DRC operations to enhance or shrink immersive-ness, enhance or shrink cross channel coherence, modifying attack times in specific audio channels, transfer or infuse the audio signals with reference styles from templates, and so forth.

3. Audio Features

Instantaneous audio (or media) features including but not limited to short-term or low-level features can be extracted from a unit of audio data (e.g., audio content, a frame or a block of audio data in an audio signal, etc.). Some or all of these instantaneous features may be extracted from magnitude spectra of transformed audio data in a transform domain (e.g., in a frequency domain, in a time-frequency domain, etc.), after the transformed audio data is generated by transforming the audio data (e.g., in a time domain, etc.) with a fast Fourier transformation (FFT).

An instantaneous feature (or feature type) represents or generates a reduced or semantic representation of the audio signal and offers semantic insights into audio related characteristics and qualities of the audio signal or the audio data therein. For example, instantaneous features (or feature types) extracted from the audio signal may be used to provide semantic insights into audio related characteristics and qualities of the audio signal including but not limited to brightness, bandwidth, tonality, noisiness and changes in spectral envelope(s) or shape(s) over time, etc.

In some operational scenarios, one or more pre-processing operations may be performed before analyzing an audio signal for instantaneous feature extraction to remove or reduce unwanted (e.g., signal, audio, etc.) artifacts/processes that otherwise might be present in the audio signal. Example pre-processing operations may include, but are not necessarily limited to only, operations related to one or more of: DC removal, frequency removal (e.g., full bandwidth frequencies, noise reduction, etc.), down-mixing, down-sampling (e.g., to lower sample rate or bit depth of the signal, etc.), half wave rectification, lag filtering, analysis resolution, control rate resolution, etc.

Inter-channel feature analysis/extraction can be applied to audio signals and used to provide or portray meaningful information of the audio signals for machine listening or computer audition (CA). Inter-channel features as described herein can be used by (e.g., artificial intelligence or AI, music information retrieval or MIR, etc.) algorithms and systems for audio understanding by machine.

In some operational scenarios, one or more datasets comprising one or more different types of inter-channel features extracted from an audio signal can be used in (or to drive) media processing operations performed in connection with the audio signal. Example media processing operations as described herein may include, but not necessarily limited to only, some or all of: synthesizing audio (e.g., with multiple depicted sound sources, etc.), modifying audio (e.g., increase or decrease presence of sounds in a subset of audio channels, enhance or suppress immersive-ness, enhance or suppress dialog, enhance or suppress a depicted sound source, etc.), sonifying audio (e.g., mapping audio data to a specific audio render that allows listeners to acquire an intended or target auditory interpretation, etc.), animating other signals for visualization or performance (e.g., animating depicted visually or audibly perceptible characters and sound sources, etc.), and so forth.

Audio feature extraction (e.g., inter-channel feature extraction, etc.) as described herein may be performed in real time for adaptive or signal-aware audio processing. Machine listening and/or computer audition as described herein differs from other MIR approaches and is capable of being performed in real time to map extracted audio features to control signals for real-time (e.g., audio rendering, audio reproduction, etc.) systems.

Additionally, optionally or alternatively, these audio features and/or the control signals mapped therefrom may be collected, stored and/or aggregated for (e.g., additional, further, real-time, online, non-real-time, offline, cloud-based, web-based, non-cloud-based, non-web-based, studio-based, etc.) algorithmic analysis, semantic analysis, immersive-ness analysis, style transfer, quality control, and so forth.

Audio feature (e.g., inter-channel instantaneous spectral, etc.) extraction and application as described herein can be implemented with a variety of audio formats (e.g., Dolby LoRo format, 5.1 format, 5.1.2 format, etc.) and used for real-time measurement and visualization spatial character of an immersive surround audio mix and/or for audio scene rendering with a variety of audio codecs (e.g., ED2 audio codecs, AC-4 audio codecs, etc.).

Example audio features as described herein may include, but are not necessarily limited to only, instantaneous spectral features as follows:

Spectral centroid—which indicates the center of gravity of spectral energy, for example computed as an index-weighted sum of spectral-specific energy values divided by their (e.g., unweighted, etc.) sum.

Spectral rolloff—which indicates a measure of the bandwidth of a block of audio, for example determined as a specific frequency bin below which accumulated magnitudes of the short-time Fourier transform (STFT) reach a certain percentage of an overall sum of magnitudes.

Spectral flux—which indicates an amount of change of the spectral shape, for example computed as an average difference between (time) consecutive STFT frames/blocks.

Spectral flatness—Which indicates how noisy a signal is (e.g., how much the signal resembles white noise, etc.). May be computed as a ratio of the geometric mean to the arithmetic mean of the magnitude spectrum.

Other instantaneous spectral features such as correlation coefficients, etc.

As an example, an audio feature such as an (e.g., instantaneous, a smoothened, etc.) spectral flux may be computed with an expression as follows:

$$\text{Flux}(n, \beta, c1, c1) = \frac{\sqrt[\beta]{\sum_{k=0}^{\frac{\kappa}{2}-1} (|X_{c1}(k,n)| - |X_{c2}(k,n-1)|)^{\beta}}}{\kappa/2} \quad (1)$$

where n represents a time index; $\beta$ represents a non-zero positive integer; c1 represents a first (audio) channel; c2 represents a second (audio) channel; k represents a frequency bin index; $\kappa$ represents an upper limit for positive frequency bin indexes (e.g., truncating all negative frequency bin indexes, etc.); $X_{c1}(k, n)$ represents a quantity (e.g., spectral component, transform coefficient, magnitude, etc.) of the k-th frequency bin at the n-th time index of a first component audio signal of the first channel; $X_{c2}(k, n-1)$ represents a quantity (e.g., spectral component, transform coefficient, magnitude, etc.) of the k-th frequency bin at the (n-1)-th time index (preceding the n-th time index) of a second component audio signal of the second channel.

When the second channel is the same as the first channel, the left-hand-side (LHS) of expression (1) represents a channel-specific spectral flux (or a channel-specific audio feature). When the second channel is different from (e.g., an adjacent channel to, etc.) the first channel, the LHS of expression (1) represents an inter-channel spectral flux (or an inter-channel audio feature). Example spectral flux description can be found in LERCH, A. "An Introduction to Audio Content Analysis Applications in Signal Processing and Music Informatics," (Wiley, Hoboken, N.J., 2012), which is incorporated herein by reference in its entirety.

As another example, an audio feature such as an (e.g., instantaneous, a smoothened, etc.) correlation coefficient (e.g., in a time domain, in a transform domain, in a time-frequency domain, in a frequency domain, etc.) may be computed as a Pearson product-moment with an expression as follows:

$$r_{xy} = \frac{\sum_{i=1}^{N} (x_i - \bar{x})(y_i - \bar{y})}{\sum_{i=1}^{N} (x_i - \bar{x})^2 (y_i - \bar{y})^2} \quad (2)$$

where x denotes a first multi-dimensional quantity generated from a first component audio signal of a first channel; y denotes a second multi-dimensional quantity generated from a second component audio signal of a second channel; N represents a dimensionality (e.g., the total number of dimensions in, etc.) each of x and y; $x_i$ represents a value in the i-th dimension (e.g., the i-th audio sample, the i-th spectral component, the i-th transform coefficient, the i-th magnitude, etc.) of x; yi represents a value in the i-th dimension (e.g., the i-th audio sample, the i-th spectral component, the i-th transform coefficient, the i-th magnitude, corresponding to the i-th dimension of x, etc.) of y; $\bar{x}$ represents an average value of all values in all dimensions of x; $\bar{y}$ represents an average value of all values in all dimensions of y.

In an example, x represents a first audio signal portion such as a first audio frame/block of a first component audio signal of a first channel, whereas y represents a second audio signal portion such as a second audio frame/block (e.g., concurrent to the first audio frame/block, preceding the first audio frame/block, subsequent to the first audio frame/block, etc.) of a second component audio signal of a second channel that is the same as the first channel. In this example, the correlation coefficient on the LHS of expression (2) represents a channel-specific correlation coefficient (or a channel-specific audio feature).

In another example, x represents a first audio signal portion such as a first audio frame/block of a first component audio signal of a first channel, whereas y represents a second audio signal portion such as a second audio frame/block (e.g., concurrent with the first audio frame/block, preceding the first audio frame/block, subsequent to the first audio frame/block, etc.) of a second component audio signal of a second channel that is different from the first channel. In this example, the correlation coefficient on the LHS of expression (2) represents an inter-channel correlation coefficient (or an inter-channel audio feature).

If the correlation coefficient $r_{xy}$ on the LHS of expression (2) above equals 1.0, then x and y are 100% correlated or identical. If the correlation coefficient $r_{xy}$ equals 0.0, then x and y are 100% decorrelated (e.g., white noise crossed with silence, etc.). If the correlation coefficient $r_{xy}$ equals −1.0, then x and y are 100% inversely correlated or opposite (e.g., phase inverted signals, etc.).

An audio feature as described herein (e.g., spectral flux, correlation coefficient, etc.) can be computed on one of: a per block basis, a per frame basis, a per block group basis, a per per frame subsequence basis, etc. The audio feature may be computed in reference to a specific channel (e.g., the audio feature represents a channel-specific audio feature, etc.) or in reference to a specific pair of channels (e.g., the audio feature represents an inter-channel audio feature, etc.).

For example, as illustrated in expression (1) above, an audio feature as described herein may be computed in relation to a specific block/frame (e.g., the n-th block/frame, etc.) and a specific channel (e.g., of the channel index c1, etc.). The specific block/frame may be a (e.g., current, currently processed, etc.) block/frame in a collection/sequence of blocks/frames. The specific channel may be a (e.g., current, currently processed, etc.) channel in a plurality of audio channels used to reproduce sounds represented in audio signals or portions therein. Each distinct block/frame in the collection/sequence of blocks/frames and each distinct audio channel in the plurality of audio channels form a distinct combination of block/frame and audio channel, thereby giving rise to a plurality of distinct combinations of block/frame and audio channel. Thus, the specific block/frame and the specific channel—in reference to which the audio feature is computed—forms only one distinct combination of block/frame and channel in a plurality of distinct combinations of block/frame and channel.

For a given audio feature type, channel-specific audio features and/or inter-channel audio features computed on a per block/frame basis in reference to each of some or all of the plurality of audio channels can be reflected, represented, displayed and/or presented as individual values in an audio feature matrix. The audio feature matrix may be arranged or rearranged to spatially reflect an audio channel/speaker configuration/environment to which the plurality of audio channels belongs. Additionally, optionally or alternatively, directional and/or locational information of audio features and/or directional and/or locational information of audio channels may be reflected, represented, displayed and/or presented in an audio feature matrix or its representation.

4. Color Coding Spatial Positions of Audio Channels

A plurality of audio channels or speakers may be assigned to, or located at, a plurality of (e.g., reference, etc.) speaker positions. Each audio channel or speaker in the plurality of audio channels or speakers may be assigned to a respective speaker position—e.g., a spatial location/direction in a rendering or reproduction environment—in the plurality of speaker positions. Example speaker locations may include, but are not necessarily limited to only, any, some or all of: Left or L, Right or R, Center or C, Left Surround or Ls, Right Surround or Rs, Left Height or Lh, Right Height or Rh, etc.

FIG. 2A illustrates an example audio feature matrix that may be used to reflect, represent, display and/or present directional and/or locational information of audio features and/or directional and/or locational information of audio channels. The (two-dimensional) audio feature matrix comprises a plurality of matrix rows and a plurality of matrix columns.

By way of example but not limitation, the plurality of matrix columns represents a plurality of audio channels for a current set of audio blocks/frames derived from a plurality of component audio signals in a multi-channel audio signal, whereas the plurality of matrix rows represents the plurality of audio channels for a preceding set of audio blocks/frames derived from the plurality of component audio signals. The current set of audio blocks/frames provides a spatial spectrum of a current audio signal portion (e.g., for a current time point, for a current time block or time window such as 5, 10, 20, 25+milliseconds, etc.) of the multi-channel audio signal across the plurality of audio channels, whereas the current set of audio blocks/frames provides a spatial spectrum of a preceding audio signal portion (e.g., for a previous time point, for a previous time block, etc.) of the multi-channel audio signal across the plurality of audio channels. An audio frame as described herein refers to a unit of audio data (e.g., for a 20 milliseconds segment of an audio signal, etc.) comprising audio samples or transform coefficients derived therefrom. An audio frame may comprise a plurality of audio blocks each of which may comprise an audio data portion captured in the audio frame.

For example, a matrix column labeled as "L" in FIG. 2A represents the audio channel L for a current audio block/frame (in the current set of audio blocks/frames) derived from a first component audio signal (in the plurality of component audio signals) for the audio channel L. A matrix column labeled as "R" in FIG. 2A represents the audio channel R for a current audio block/frame (in the current set of audio blocks/frames) derived from a second component audio signal (in the plurality of component audio signals) for the audio channel R.

Likewise, a matrix row labeled as "L-1" in FIG. 2A represents the audio channel L for a preceding audio block/frame (in the preceding set of audio blocks/frames) derived from the first component audio signal for the audio channel L. A matrix row labeled as "R-1" in FIG. 2A represents the audio channel R for a preceding audio block/frame (in the preceding set of audio blocks/frames) derived from the second component audio signal for the audio channel R.

Each matrix element in the audio feature matrix is indexed by a specific matrix column in the plurality of matrix columns and a specific matrix row in the plurality of matrix rows, and used to store, reflect, represent, display and/or present an audio feature computed based at least in part on a current audio block/frame for a first channel as indicated by the specific matrix column and a preceding audio block/frame for a second channel as indicated by the specific matrix row.

As a first example, a matrix element is indexed by the matrix column labeled with "L" and the matrix row labeled with "L-1", and used to store, reflect, represent, display and/or present an audio feature computed based at least in part on a current audio block/frame for the audio channel L as indicated by the matrix column "L" and a preceding audio block/frame for the audio channel L as indicated by the matrix row "L-1". In the present example, the audio channels indicated by the matrix column "L" and the matrix row "L-1" are the same, the audio feature represented/stored in the matrix element is a channel-specific audio feature such as a channel-specific spectral flux (denoted as "SF(L, L-1)").

As a second example, a matrix element is indexed by the matrix column labeled with "L" and the matrix row labeled with "R-1", and used to store, reflect, represent, display and/or present an audio feature computed based at least in part on a current audio block/frame for the audio channel L as indicated by the matrix column "L" and a preceding audio block/frame for the audio channel R as indicated by the matrix row "R-1". In the present example, the audio channels indicated by the matrix column "L" and the matrix row "R-1" are different, the audio feature represented/stored in the matrix element is an inter-channel audio feature such as an inter-channel spectral flux (denoted as "SF(L, R-1)").

It should be noted that other types of audio features other than spectral fluxes may also be stored, reflected, represented, displayed and/or presented in audio feature matrixes as described herein.

By way of illustration but not limitation, the audio feature matrix provides an example matrix representation of (e.g., cross channel or inter-channel, etc.) spectral fluxes for a multi-channel audio signal in a 5.1.2 audio format. Inter-channel spectral fluxes of the multi-channel audio signal are instantaneous audio features used to measure or calculate movements of spectral power across channels over time. The plurality of matrix columns represents a plurality of audio channels for a current set of audio blocks/frames (e.g., $|X_{c1}(k, n)|$ in expression (1), etc.) derived from a plurality of component audio signals in a multi-channel audio signal, whereas the plurality of matrix rows represents the plurality of audio channels for a preceding set of audio blocks/frames (e.g., $|X_{c2}(k, n-1)|$ in expression (1), etc.) derived from the plurality of component audio signals.

Rather than calculating (e.g., only, etc.) fluxes from power of a previous block/frame of the same channel, a system as described herein generates the audio feature matrix to capture or compute fluxes from power of a previous block/frame of different channel(s) such as adjacent channel(s). As a result, the fluxes of power across different channels are captured, computed and/or represented in the audio feature matrix to detect directionality of audio object (or depicted sound source) movement across various channels over time, with each matrix element of the audio feature matrix representing/displaying the directionality between a first channel/speaker from which the audio object (or depicted sound source) resides to a second channel/speaker to which the audio object (or depicted sound source) moves.

Audio features such as fluxes across channels can be mapped and animated in an audio feature matrix or a representation thereof with the fluxes of specific channels/speakers respectively aligned to speaker positions of the channels/speakers, thereby displaying or conveying an overall representation of rendered audio objects (or depicted sound sources) moving in an immersive mix represented in the multi-channel audio signal.

Additionally, optionally or alternatively, an algorithm implemented by a system as described herein may be reconfigured or redirected to capture or compute audio features based on per-bin fluxes (e.g., individual fluxes per frequency bin, etc.) to provide a more detailed frequency analysis (e.g., frequency-specific analysis, etc.) or a more detailed frequency visualization (e.g., frequency-specific visualization, etc.) of fluxes of spectral power across various channels/speakers, instead of or in addition to summing fluxes for all bins for each (e.g., FFT, etc.) block/frame to provide an overall analysis (e.g., non-frequency-specific analysis, etc.) or an overall visualization (e.g., non-frequency-specific visualization, etc.) of fluxes of spectral power across various channels/speakers.

Figure 2B:
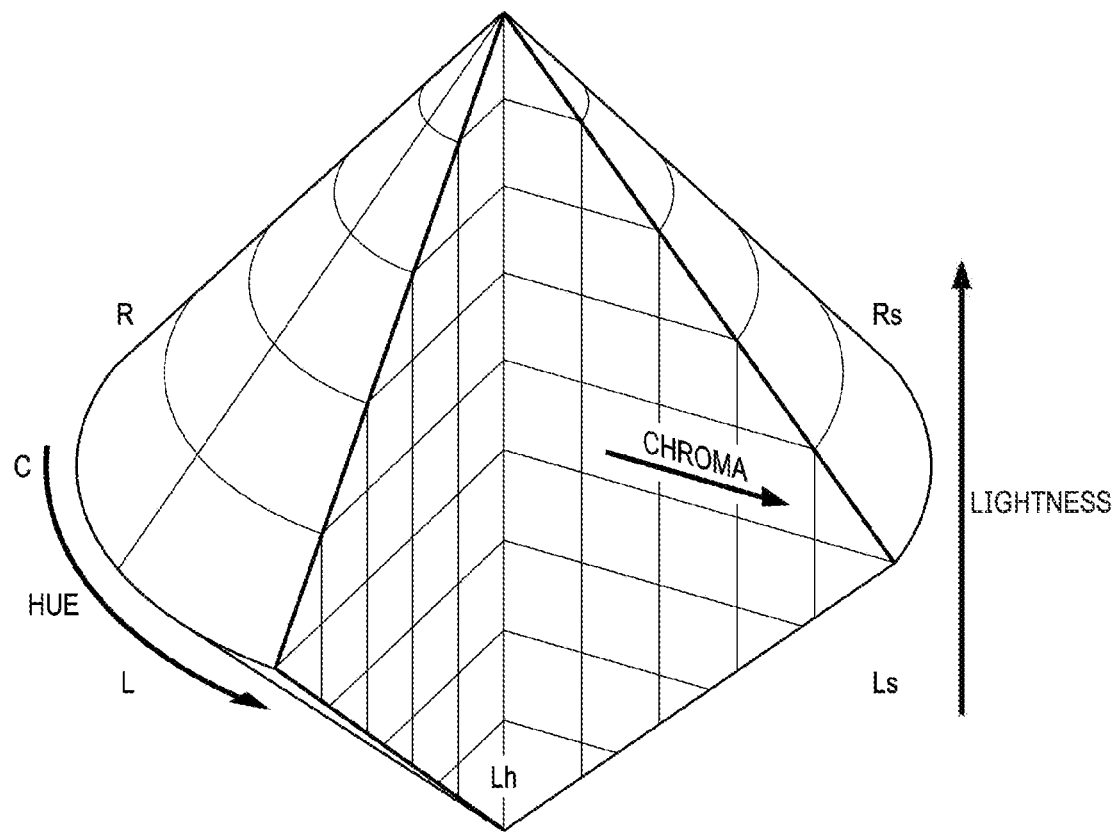
FIG. 2B illustrates example mappings of audio channels to respective colors in a three-dimensional color model.

FIG. 2B illustrates example mappings of audio channels (or audio speakers) to respective colors in a three-dimensional color model. By way of illustration but not limitation, the three-dimensional color model used to map the audio channels to their respective colors is represented by an HSL (Hue, Saturation, Luminosity) color model. In the HSL model as illustrated in FIG. 2B, lightness or brightness of colors is represented by vertical positions of the colors along a vertical axis or direction. At a given lightness, different hues or colors are arranged as a circle in a horizontal plane or slice. The HSL model has a central axis (e.g., a vertical symmetric axis, etc.) of neutral colors ranges from dark black at the bottom to white at the top.

Different audio channels or speakers may be mapped to different colors or hues by way of a color model. For example, as illustrated in FIG. 2B, in some operational scenarios, the audio speaker L is mapped to yellow; the audio speaker R is mapped to red; the audio speaker C is mapped to orange; the audio speaker Ls is mapped to cyan; the audio speaker Rs is mapped to blue; the audio speaker Lh is mapped to green; the audio speaker Rh (not shown) is mapped to magenta; etc., around the largest circle in the bottom of the color model. For the purpose of illustration only, the low-frequency effect (LFE) audio channel or speaker is not mapped.

5. Gui Representations of Audio Media Features

Figure 3A:
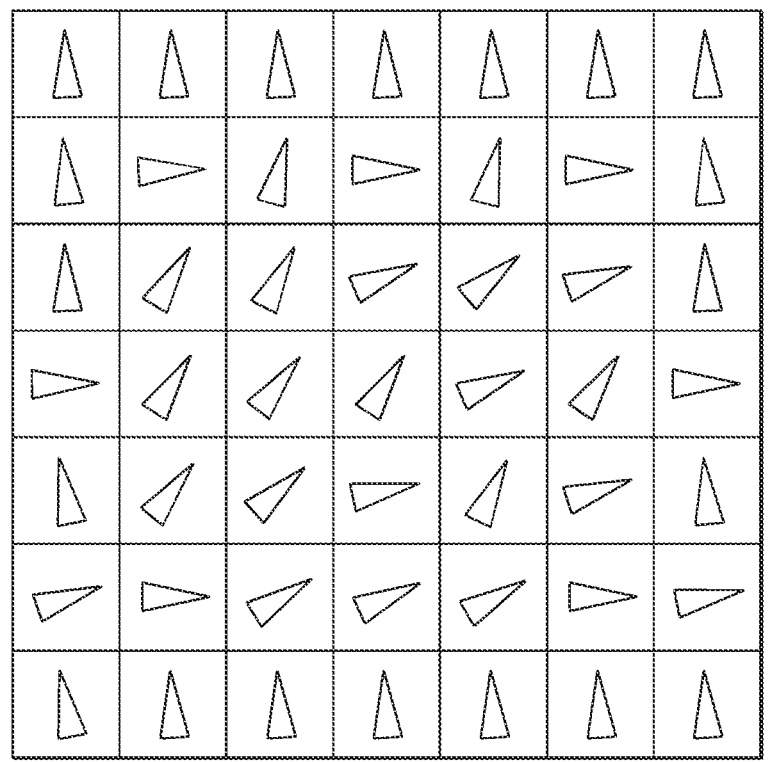
Figure 3B:
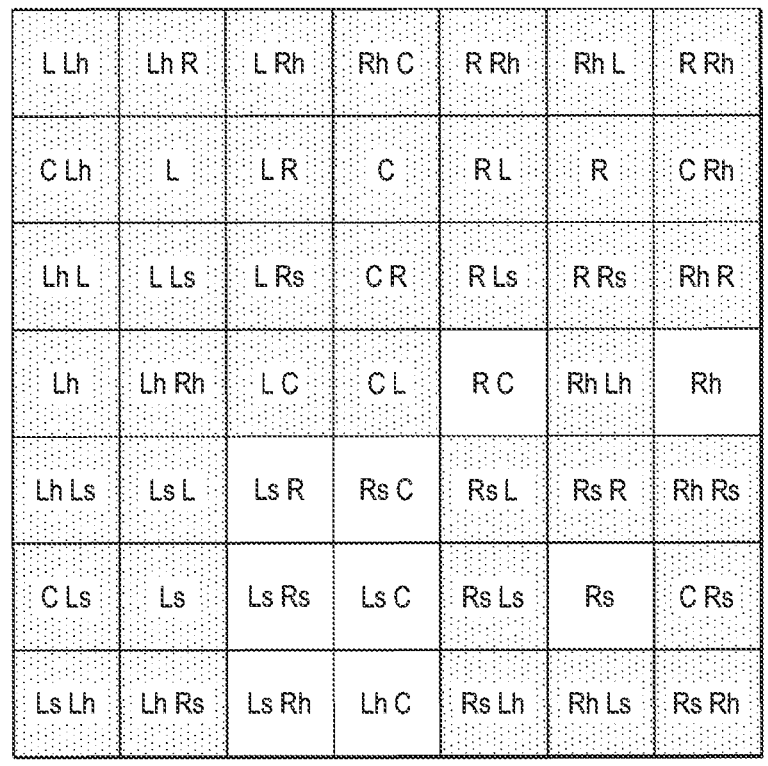

FIG. 3A through FIG. 3F illustrate example graphic user interface (GUI) representations of audio media features. FIG. 3A illustrates an example heat map visualization of a (e.g., cross channel or inter-channel, etc.) correlation coefficient matrix. FIG. 3B through FIG. 3F illustrate example heat map visualizations of (e.g., cross channel or inter-channel, etc.) spectral flux matrix(es). Each GUI representation here may be rendered on a user interface display operating in conjunction with a system as described herein to interact with a user to monitor audio signals, modify the audio signals, generate spatial audio metadata, etc.

The audio media features represented in a GUI representation as described herein may be captured/stored by an audio media matrix, which can be dynamically updated or driven by current audio signal portions in combination with other audio signal portions such as preceding or subsequent audio signal portions, audio signal portions of spatially adjacent or spatially identical channels, and so forth.

The current audio signal portions may comprise a current set of audio blocks/frames, for a current time point or a current time block/window, in a plurality of audio channels represented a multi-channel audio signal.

As used herein, a current time point/block/window may refer to a time point/block/window (e.g., a current wall clock time point/block/window, etc.) at which the multi-channel audio signal is currently being rendered, is most recently rendered, is next to be rendered, etc. Additionally, optionally or alternatively, a current time point/block/window may refer to a time point/block/window (e.g., a logical time point/block/window represented in the multi-channel audio signal, etc.) at which a user or system is viewing, analyzing, or manipulating channel-specific or inter-channel characteristics, styles, immersive-ness, envelope, attack times, etc., of the multi-channel audio signal. A preceding time point/block/window may refer to a time point/block/window (e.g., immediately, etc.) preceding the current time point/block/window. A subsequent time point/block/window may refer to a time point/block/window (e.g., immediately, etc.) succeeding the current time point/block/window.

A GUI representation as described herein may be automatically dynamically updated, for example on a per block/frame basis, on a per block/frame group basis, etc. For example, a current time point/block/window, once automatically or manually selected, may be automatically continuously advanced along a normal playback direction of the multi-channel audio signal, until a user or system selects (e.g., by fast forwarding, by clicking operations, by rewinding, in slow motion, with a normal playback speed, etc.) a different current time point/block/window.

By way of illustration but not limitation, the GUI representation is a square table comprising a plurality of GUI cells indexed by a plurality of table columns and a plurality of table rows. In some operational scenarios, all audio feature matrix elements in the audio feature matrix storing audio features computed in relation to a current time point/block/window are represented in their respective GUI cells in the plurality of GUI cells.

For example, there may be a 1-1 mapping between a plurality of matrix columns in the audio feature matrix and the plurality of table columns in the GUI representation. Likewise, there may be a 1-1 mapping between a plurality of matrix rows in the audio feature matrix and the plurality of table rows in the GUI representation.

It should be noted that in various embodiments, other mappings between the audio feature matrix and the GUI representation can be used or implemented under techniques as described herein. For example, instead of using 1-1 mappings between matrix columns and table columns or between matrix rows and table rows, a set of 1-1 mappings between matrix elements and table cells may be used, in place of 1-1 mappings between matrix columns and table columns or between matrix rows and table rows.

As illustrated in FIG. 3A, in some operational scenarios, an audio feature as captured in an audio feature matrix element as described herein may be represented with a visually perceptible directional indicator (e.g., a GUI component, etc.) on a GUI representation. By way of example but not limitation, the audio feature matrix elements in the audio feature matrix used to drive the GUI representation of FIG. 3A capture/store channel-specific and inter-channel correlation coefficients for a current time point/block/window.

A directional (GUI) indicator in the GUI representation of FIG. 3A points to right if the indicator is to represent a correlation coefficient of a value of positive one (1.0). A directional (GUI) indicator in the GUI representation of FIG. 3A points upwards if the indicator is to represent a correlation coefficient of a value of zero (0.0). A directional (GUI) indicator in the GUI representation of FIG. 3A points to left if the indicator is to represent a correlation coefficient of a value of negative one (−1.0). A directional (GUI) indicator in the GUI representation of FIG. 3A points to an intermediate direction other than right, upward and left if the indicator is to represent a correlation coefficient of an intermediate value other than positive one, zero or negative one. Additionally, optionally or alternatively, a directional indicator may be used to indicate spatial direction of an audio feature such as a spatial direction of spectral flux, etc.

In some operational scenarios, the color of (e.g., a directional indicator in, a numeric value in, lightness or brightness in, etc.) a table cell in a GUI representation as described herein may be represented with a respective color assigned to an audio channel of a current audio data portion represented in the table cell. The color may be selected or determined based on mappings between audio channels and colors such as indicated in FIG. 2B. In some examples, colors of directional indicators in table cells in a GUI representation as described herein may be selected or determined using colors assigned to audio channels of a current set of audio blocks/frames represented in the table cells. In other examples, foreground or background colors of table cells in each GUI representation may be selected or determined using colors assigned to audio channels of a current set of audio blocks/frames represented in the table cells.

In some operational scenarios, the absolute value, or magnitude of a correlation coefficient may be represented with a respective lightness or brightness of a foreground or background color. In some examples, the background color may be gray from black (e.g., representing a value of zero (0), etc.) to white (e.g., representing a value of one (1), etc.). In other examples, the foreground or background color assigned to respective audio channels represented in table cells in a GUI representation as described herein may be assigned to different levels of lightness or brightness depending on values or magnitudes represented in the table cells.

As illustrated in FIG. 3F, in some operational scenarios, an audio feature as captured in an audio feature matrix element as described herein may be represented with a numeric indicator (e.g., a GUI component, etc.) on a GUI representation. A numeric value indicated by the numeric indicator may be a value of the audio feature.

Some or all of GUI components in a GUI representation as described herein may be interactive. For example, one or more table cells in a GUI representation of any of FIG. 3A through FIG. 3F may be clicked or selected to display or access options, popups, related GUI representations, etc.

FIG. 3G illustrates an example GUI representation that may be launched by a user—e.g., interacting with a GUI representation of one or more of FIG. 3A through FIG. 3F—to display (e.g., instantaneous, time-averaged, smoothened with a filter, etc.) inter-channel spectral fluxes across three zones in a 5.1.2 audio format. These three zones include a left-only-right-only zone or LoRo (denoted as "Zone LR") comprising the audio channels/speakers L and R; a left-surround-right-surround zone (denoted as "Zone LsRs") comprising the audio channels/speakers Ls and Rs; and a height zone (denoted as "Zone Heights") comprising the audio channels/speakers Lh and Rh. By way of example but not limitation, the plots of FIG. 3G reflect or represent real-time and/or non-real-time numeric data for inter-channel spectral fluxes (denoted as "ICSF Mean Zone LR," "ICSF Mean Zone LsRs" and "ICSF Mean Zone Heights," respectively) in the three zones. In some operational scenarios, quantities such as "average fluxes" that are representative of average power may be used to characterize or constitute "mean zones" or quantities associated with "mean zones." Thus, under techniques as described herein, combinatorial higher-level features may be constructed from a matrix decomposition or representation of audio features, whether using simple averaging techniques or more complex statistical analysis based speaker groups (e.g. location-dependent, etc.).

As illustrated in FIG. 3G, the largest amount of fluxes as represented by the plot "ICSF Mean Zone LsRs" appears in the surround zone ("Zone LsRs"). Thus, the user can determine, by way of these GUI representations, that the multi-channel audio signal giving rise to these plots is of a relatively high degree of immersive-ness. Conversely, if fluxes as represented by the plot "ICSF Mean Zone LsRs" were relatively small (not shown), then the user would determine that the multi-channel audio signal giving rise to these plots were of a relatively high degree of immersiveness.

Based on the characteristics, styles, or immersive-ness, etc., as represented in or conveyed through the GUI representations, the user can cause per-channel loudness (e.g., volume, averaged amplitude of spatial pressure wave over time, etc.) to be modulated to achieve a target level of immersive-ness specifically adapted for a specific audible event, audio scene, audio portion, etc. Loudness—amplitude average over time. Loudness modulation algorithms/methods/operations (e.g., DRC algorithms/methods/operations, etc.) may be adaptively modified or invoked based on user input to regulate loudness in individual channels to achieve the target level of immersive-ness. For example, loudness in one or more channels may be decreased, while loudness in one or more other channels may be increased. Loudness of dialog may be enhanced to decrease immersive-ness, shrunk to increase immersive-ness. Additionally, optionally or alternatively, one or more audio objects or depicted sound sources may be removed or suppressed from a specific audible event, audio scene, audio portion, etc.

A GUI representation such as any of FIG. 3A through FIG. 3G may be used to convey or depict dynamic motions of audio objects or depicted sound sources represented in a multi-channel audio signal. For example, if all audio objects or depicted sound sources in the multi-channel audio signal collectively make a global spatial rotation, then all inter-channel fluxes and/or inter-channel correlation coefficients may indicate relatively high magnitude values. If an individual audio object or depicted sound source in the multi-channel audio signal makes an individual spatial rotation, then inter-channel fluxes and/or inter-channel correlation coefficients two or more specific channels but not necessarily other channels may indicate relatively high magnitude values.

Likewise, linear motions such as translations made by some or all depicted sound sources may be visualized through one or more GUI representations as described herein.

Additionally, optionally or alternatively, other spatial information such as rates of rotations, directions of rotations, etc., may also be conveyed or provided through one or more GUI representations as described herein.

Through one or more GUI representations of audio features of the audio signal, the user can visualize, perceive and/or validate auditory characteristics or styles, immersive-ness of audio content for dialogs, cartoons, games, etc.

Numeric values representing per-channel or per-channel-pair audio features in a specific subset (e.g., a surround zone, a height zone, etc.) of channels may be grouped into group values (e.g., average, mean, etc.). The grouped audio feature values may be used to convey auditory characteristics or styles or immersive-ness of audio content represented in the specific subset of channels.

An envelope of an auditory event (e.g., an airplane flying overhead, etc.) may be visualized and monitored to determine whether audio signal activities as indicated by audio features show up coherently at the same time in the channels involved in depicting the auditory event or whether audio signal activities show up chaotically at different times in the channels involved in depicting the auditory event. In operational scenarios in which audio renders or audio signals are generated by different audio decoders/renderers, audio features extracted from these different audio renders or audio signals can be indicated through one or more GUI representations as described herein to determine whether any audio render or audio signal shows the best overall coherence/correlation, or whether any audio render or audio signal shows the most overall chaos, or whether any channel (e.g., attack times of an audio event such as a piano striking represented in different audio channels, etc.) should be further synchronized by a specific audio renderer/decoder (e.g., a cloud-based or web-based audio renderer/decoder, etc.). As used herein, "chaos" may refer to non-uniform perceptible movements and complex signal interactions (e.g., among audio objects and/or sound sources, among different audio channels, etc.) in a spatial audio scene.

In some operational scenarios, a composite of two or more GUI representations may be displayed on a single display page. For example, one or more GUI frames/panes on the display page may be used to display one or more of GUI representations of FIG. 3A through FIG. 3F, while one or more GUI frames/panes on the display page may be used to display one or more GUI representations of FIG. 3G or other types. User interface control components may be rendered on the display page. A user interface control component may be used by a user to cause audio processing operations to be performed to modify an audio signal. Example audio processing operations effectuated through one or more user interface components may include, but are not necessarily limited to only, any of: enhance or shrink immersive-ness, synchronize attack times in two or more channels, real time editing of audio content, remove audio objects, change DRC operations, adaptively modify or transfer style to a particular audio data portion, add spatial metadata in a modified audio signal generated from the (input) audio signal, etc.), etc.

In some operational scenarios, an audio signal received by a system as described herein comprise audio data as PCM data. In some operational scenarios, an audio signal received by a system as described herein comprise audio data as non-PCM data. Some or all audio processing operations may operate on PCM data and/or non-PCM data. These audio processing operations may be used to generate auditory characteristics or styles or immersive-ness in accordance with specific artistic intent and/or to cause depiction of sound objects or auditory events relatively accurate. If deviation from artistic intent, inaccuracy in audio content envelopes or attack times, unintended chaos, predictable audible artifacts, etc., are detected through representations of audio features in GUI representations by a user or a system as described herein, corrective actions may be taken accordingly to address these issues.

6. Example Process Flows

Figure 4:
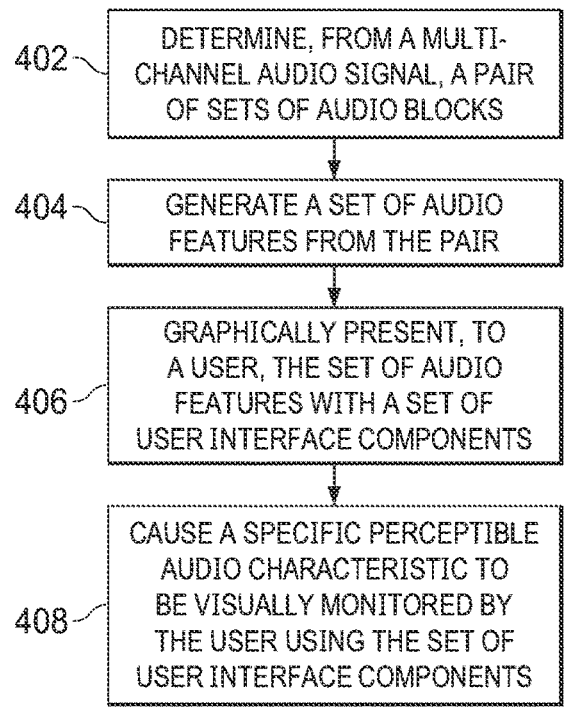
FIG. 4 illustrates an example process flow.

FIG. 4 illustrates an example process flow according to an embodiment. In some embodiments, one or more computing devices or components (e.g., a media processing system, an audio render analysis system, a cloud-based system, a web-based system, etc.) may perform this process flow. In block 402, a system as described herein determines, from a multi-channel audio signal, a pair of sets of audio blocks. The pair of sets of audio blocks comprises a first set of audio blocks for a first time block over a plurality of audio channels and a second set of audio blocks for a second time block over the plurality of audio channels. The first time block is different from the second time block.

In block 404, the system generates a set of audio features from the first set of audio blocks and the second set of audio blocks in the pair of sets of audio blocks. The set of audio features includes one or more inter-channel audio features.

In block 406, the system graphically presents, to a user, the set of audio features with a set of user interface components on a display page. Each user interface component in the set of user interface components represents a respective audio feature in the set of audio features. The respective audio feature is computed from a first audio block in the first set of audio blocks and a second audio block in the second set of audio blocks.

In block 408, the system causes a specific perceptible audio characteristic to be visually monitored by the user using the set of user interface components on the display page dynamically updated with a plurality of sets of audio features computed from a plurality of pairs of sets of audio blocks of the multi-channel audio signal. Each set of audio features in the plurality of sets of audio features is computed from a respective pair of sets of audio blocks in the plurality of pairs of sets of audio blocks.

In an embodiment, the first time block represents a current time block for which the set of audio features is computed; the second time block precedes the first time block.

In an embodiment, the first time block represents a current time block for which the set of audio features is computed; the second time block succeeds the first time block.

In an embodiment, the one or more inter-channel audio features represent one or more inter-channel correlation coefficients.

In an embodiment, the one or more inter-channel audio features represent one or more inter-channel spectral fluxes.

In an embodiment, the specific perceptible audio characteristic to be visually monitored by the user represents an immersive-ness of the multi-channel audio signal for the first time block.

In an embodiment, the specific perceptible audio characteristic to be visually monitored by the user represents a level of immersive-ness of the multi-channel audio signal for the first time block.

In an embodiment, the level of immersive-ness of the multi-channel audio signal for the first time block is modified, based on user input provided by the user, in a modified multi-channel audio signal generated from the multi-channel audio signal.

In an embodiment, the specific perceptible audio characteristic to be visually monitored by the user represents a level of animation of one or more audio objects represented in the multi-channel audio signal for the first time block.

In an embodiment, one or more dynamic range control operations are caused by the user to be performed on one or more audio channels in the plurality of audio channels while the user is visually monitoring the specific perceptible audio characteristic represented by the set of user interface components dynamically updated with the plurality of sets of audio features.

In an embodiment, colors of user interface components in the set of user interface components indicate respective audio channels of audio blocks used to compute audio features represented by the user interface components.

In an embodiment, the multi-channel audio channel is an audio render generated by a cloud-based audio rendering system.

In an embodiment, a non-transitory computer readable storage medium, comprising software instructions, which when executed by one or more processors cause performance of any one of the methods as described herein. Note that, although separate embodiments are discussed herein, any combination of embodiments and/or partial embodiments discussed herein may be combined to form further embodiments.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
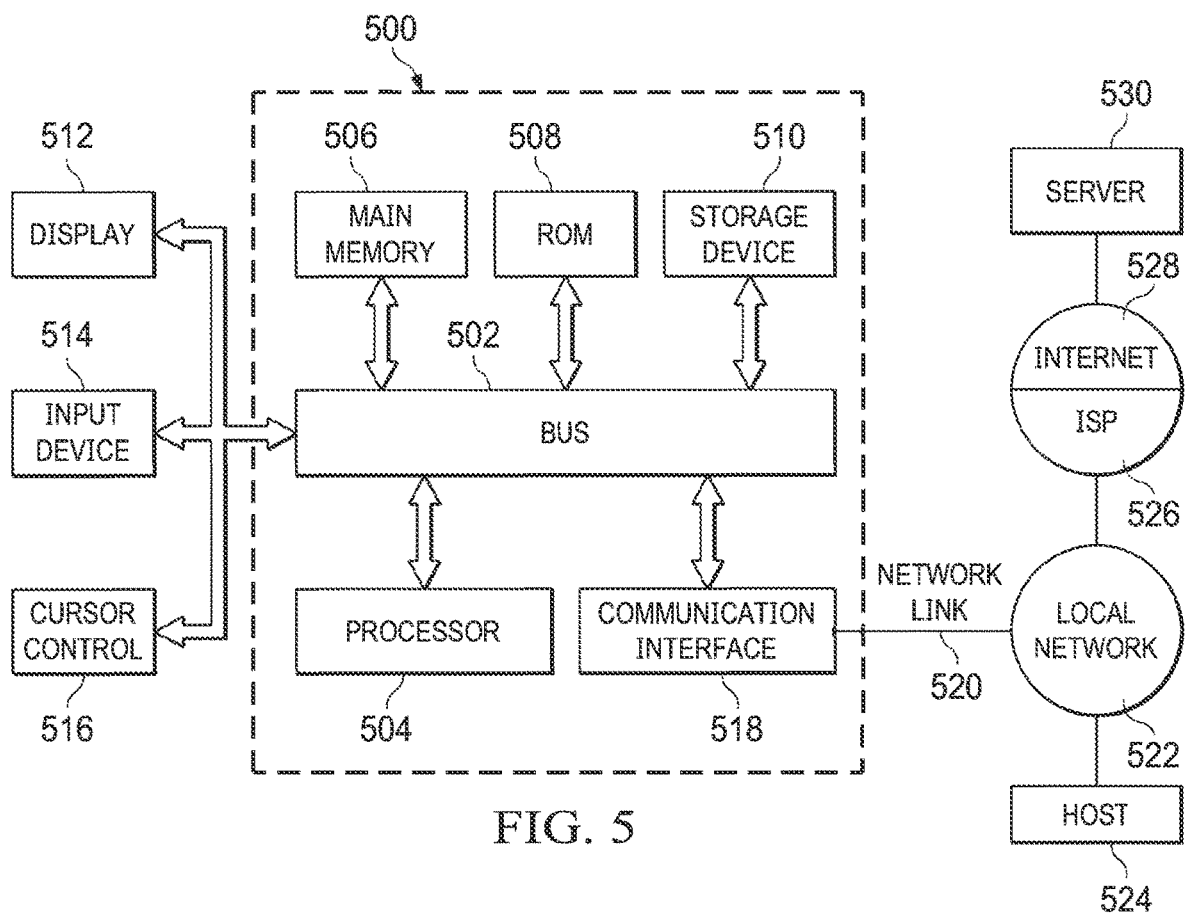
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Equivalents, Extensions, Alternatives and Miscellaneous

In the foregoing specification, embodiments of the invention have been described with reference to numerous specific details that may vary from implementation to implementation. Thus, the sole and exclusive indicator of what is embodiments of the invention and is intended by the applicants to be embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A computer-implemented method, comprising:
determining, from a multi-channel audio signal, a pair of sets of audio blocks, wherein the pair of sets of audio blocks comprises a first set of audio blocks for a first time block over a plurality of audio channels and a second set of audio blocks for a second time block over the plurality of audio channels;
generating a set of audio features from the first set of audio blocks and the second set of audio blocks in the pair of sets of audio blocks, wherein the set of audio features includes one or more inter-channel audio features;
graphically presenting, to a user, the set of audio features by way of a set of user interface components on a display page, wherein each user interface component in the set of user interface components represents a respective audio feature in the set of audio features, wherein the respective audio feature is computed from a first audio block in the first set of audio blocks and a second audio block in the second set of audio blocks;
visually conveying a specific perceptible audio characteristic to the user using the set of user interface components on the display page dynamically updated with a plurality of sets of audio features computed from a plurality of pairs of sets of audio blocks of the multi-channel audio signal, wherein each set of audio features in the plurality of sets of audio features is computed from a respective pair of sets of audio blocks in the plurality of pairs of sets of audio blocks.

EEE 2. The method as recited in EEE 1, wherein the first time block is one of: concurrent to, preceding, or succeeding, the second time block.

EEE 3. The method as recited in any of EEEs 1-2, wherein the one or more inter-channel audio features represent one or more of: inter-channel correlation coefficients or inter-channel spectral fluxes.

EEE 4. The method as recited in any of EEEs 1-3, wherein the specific perceptible audio characteristic visually conveyed to the user represents one of: an immersive-ness of the multi-channel audio signal, a level of immersive-ness of the multi-channel audio signal, or a level of animation of one or more audio objects represented in the multi-channel audio signal for the first time block.

EEE 5. The method as recited in EEE 4, wherein the level of immersive-ness of the multi-channel audio signal for the first time block is modified, based on user input provided by the user, in a modified multi-channel audio signal generated from the multi-channel audio signal.

EEE 6. The method as recited in any of EEEs 1-5, wherein one or more dynamic range control operations are caused by the user to be performed on one or more audio channels in the plurality of audio channels while the specific perceptible audio characteristic represented by the set of user interface components as dynamically updated with the plurality of sets of audio features is being visually conveyed to the user.

EEE 7. The method as recited in any of EEEs 1-6, wherein colors of user interface components in the set of user interface components indicate respective audio channels of audio blocks used to compute audio features represented by the user interface components.

EEE 8. The method as recited in any of EEEs 1-7, wherein the multi-channel audio signal is an audio render generated by a cloud-based audio rendering system.

EEE 9. The method as recited in any of EEEs 1-8, wherein spatial information of one or more audio objects depicted in an input multi-channel audio signal is identified using the set of audio features and included as spatial audio metadata to be transmitted with corresponding audio data in an output multi-channel audio signal.

EEE 10. The method as recited in any of EEEs 1-9, wherein values for audio features in the set of audio features are represented in an audio feature matrix; wherein the audio feature matrix comprise rows and columns reflecting spatial positions of speakers in an audio rendering environment for rendering the multi-channel audio signal.

EEE 11. The method as recited in any of EEEs 1-10, wherein the set of user interface components on the display page comprises one or more of: directional indicators with audio-feature dependent orientations, audio speaker position indications, correlation indications, or decorrelation indications.

EEE 12. The method as recited in any of EEEs 1-11, wherein the set of audio features comprises at least one per-frequency-bin audio feature.

EEE 13. The method as recited in any of EEEs 1-12, wherein the plurality of audio channels are mapped to a plurality of different colors using an HSL (Hue, Saturation, Luminosity) color model.

EEE 14. An apparatus comprising a processor and configured to perform any one of the methods recited in EEEs 1-13.

EEE 15. A non-transitory computer-readable storage medium having stored thereon computer-executable instruction for executing a method with one or more processors in accordance with any of the methods recited in EEEs 1-13.

What is claimed is:

1. A computer-implemented method, comprising:
   determining, from a multi-channel audio signal, a pair of sets of audio blocks, wherein the pair of sets of audio blocks comprises a first set of audio blocks for a first time block over a plurality of audio channels and a second set of audio blocks for a second time block over the plurality of audio channels;
   generating a set of audio features from the first set of audio blocks and the second set of audio blocks in the pair of sets of audio blocks, wherein the set of audio features includes one or more inter-channel audio features;
   graphically presenting, to a user, the set of audio features by way of a set of user interface components on a display page, wherein each user interface component in the set of user interface components represents a respective audio feature in the set of audio features, wherein the respective audio feature is computed from a first audio block in the first set of audio blocks and a second audio block in the second set of audio blocks;
   visually conveying a specific perceptible audio characteristic to the user using the set of user interface components on the display page dynamically updated with a plurality of sets of audio features computed from a plurality of pairs of sets of audio blocks of the multi-channel audio signal, wherein each set of audio features in the plurality of sets of audio features is computed from a respective pair of sets of audio blocks in the plurality of pairs of sets of audio blocks.

2. The method as recited in claim 1, wherein the first time block is one of: concurrent to, preceding, or succeeding, the second time block.

3. The method as recited in claim 1, wherein the one or more inter-channel audio features represent one or more of: inter-channel correlation coefficients or inter-channel spectral fluxes.

4. The method as recited in claim 1, wherein the specific perceptible audio characteristic visually conveyed to the user represents one of: an immersive-ness of the multi-channel audio signal, a level of immersive-ness of the multi-channel audio signal, or a level of animation of one or more audio objects represented in the multi-channel audio signal for the first time block.

5. The method as recited in claim 4, wherein the level of immersive-ness of the multi-channel audio signal for the first time block is modified, based on user input provided by the user, in a modified multi-channel audio signal generated from the multi-channel audio signal.

6. The method as recited in claim 1, wherein one or more dynamic range control operations are caused by the user to be performed on one or more audio channels in the plurality of audio channels while the specific perceptible audio characteristic represented by the set of user interface components as dynamically updated with the plurality of sets of audio features is being visually conveyed to the user.

7. The method as recited in claim 1, wherein colors of user interface components in the set of user interface components indicate respective audio channels of audio blocks used to compute audio features represented by the user interface components.

8. The method as recited in claim 1, wherein the multi-channel audio signal is an audio render generated by a cloud-based audio rendering system.

9. The method as recited in claim 1, wherein spatial information of one or more audio objects depicted in an input multi-channel audio signal is identified using the set of audio features and included as spatial audio metadata to be transmitted with corresponding audio data in an output multi-channel audio signal.

10. The method as recited in claim 1, wherein values for audio features in the set of audio features are represented in an audio feature matrix; wherein the audio feature matrix comprise rows and columns reflecting spatial positions of speakers in an audio rendering environment for rendering the multi-channel audio signal.

11. The method as recited in claim 1, wherein the set of user interface components on the display page comprises one or more of: directional indicators with audio-feature dependent orientations, audio speaker position indications, correlation indications, or decorrelation indications.

12. The method as recited in claim 1, wherein the set of audio features comprises at least one per-frequency-bin audio feature.

13. The method as recited in claim 1, wherein the plurality of audio channels are mapped to a plurality of different colors using an HSL (Hue, Saturation, Luminosity) color model.

14. An apparatus comprising a processor and configured to perform the method recited in claim 1.

15. A non-transitory computer-readable storage medium having stored thereon computer-executable instruction for executing a method with one or more processors in accordance with the method recited in claim 1.

* * * * *